(12) United States Patent
Keeler et al.

(10) Patent No.: US 10,459,658 B2
(45) Date of Patent: Oct. 29, 2019

(54) HYBRID DATA STORAGE DEVICE WITH EMBEDDED COMMAND QUEUING

(71) Applicant: Seagate Technology LLC, Cupertino, CA (US)

(72) Inventors: Stanton M. Keeler, Longmont, CO (US); John D. Moon, Superior, CO (US); Greg D. Larrew, Berthoud, CO (US); Leata M. Blankenship, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/190,948

(22) Filed: Jun. 23, 2016

(65) Prior Publication Data

US 2017/0371589 A1  Dec. 28, 2017

(51) Int. Cl.
*G06F 3/06* (2006.01)

(52) U.S. Cl.
CPC ............ *G06F 3/0659* (2013.01); *G06F 3/061* (2013.01); *G06F 3/068* (2013.01); *G06F 3/0656* (2013.01)

(58) Field of Classification Search
CPC .... G06F 3/0685; G06F 3/0656; G06F 3/0644; G06F 3/061; G06F 3/0659
See application file for complete search history.

(56) References Cited

U.S. PATENT DOCUMENTS

| | | | |
|---|---|---|---|
| 7,861,038 B2 | 12/2010 | Fontenot et al. | |
| 8,639,872 B1 | 1/2014 | Boyle et al. | |
| 8,661,194 B2 | 2/2014 | Nam | |
| 9,009,393 B1 | 4/2015 | Sutardja | |
| 9,959,209 B1* | 5/2018 | Burton | G06F 12/0866 |
| 2005/0172067 A1* | 8/2005 | Sinclair | G06F 3/0613 711/103 |
| 2006/0075185 A1* | 4/2006 | Azzarito | G06F 12/0866 711/113 |
| 2008/0024899 A1* | 1/2008 | Chu | G06F 3/0614 360/69 |
| 2008/0052456 A1* | 2/2008 | Ash | G06F 12/0804 711/113 |
| 2009/0204872 A1 | 8/2009 | Yu et al. | |
| 2009/0259749 A1* | 10/2009 | Barrett | G06F 11/3495 709/224 |
| 2010/0088459 A1 | 4/2010 | Arya et al. | |

(Continued)

*Primary Examiner* — Larry T Mackall
(74) *Attorney, Agent, or Firm* — Hall Estill Attorneys at Law

(57) ABSTRACT

Apparatus and method for managing data in a hybrid data storage device. In some embodiments, a hybrid device has a hard disc drive (HDD) controller circuit coupled to non-volatile rotatable storage media and a solid state drive (SSD) controller circuit coupled to non-volatile solid state memory. A top level controller circuit directs a first portion of the received access commands to the HDD controller circuit and a second portion of the received access commands to the SSD controller circuit. The top level controller circuit performs an embedded queuing operation to forward internally generated data cleaning commands to an HDD command queue to write data previously transferred from the host device to the solid state memory to the rotatable storage media concurrently while least one of the first portion of the access commands is pending in the HDD command queue.

20 Claims, 5 Drawing Sheets

(56) References Cited

U.S. PATENT DOCUMENTS

| | | | |
|---|---|---|---|
| 2011/0283065 A1* | 11/2011 | Kurashige | G06F 12/0866 |
| | | | 711/118 |
| 2012/0166749 A1* | 6/2012 | Eleftheriou | G06F 3/0616 |
| | | | 711/165 |
| 2014/0207996 A1 | 7/2014 | Fisher et al. | |
| 2014/0233132 A1 | 8/2014 | Budiman et al. | |

* cited by examiner

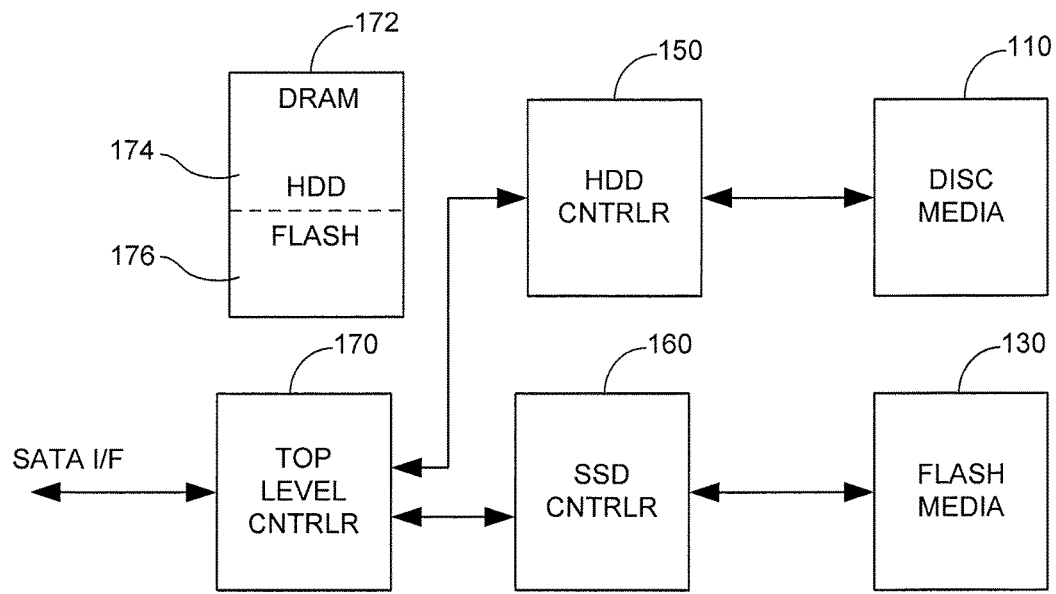
FIG. 4
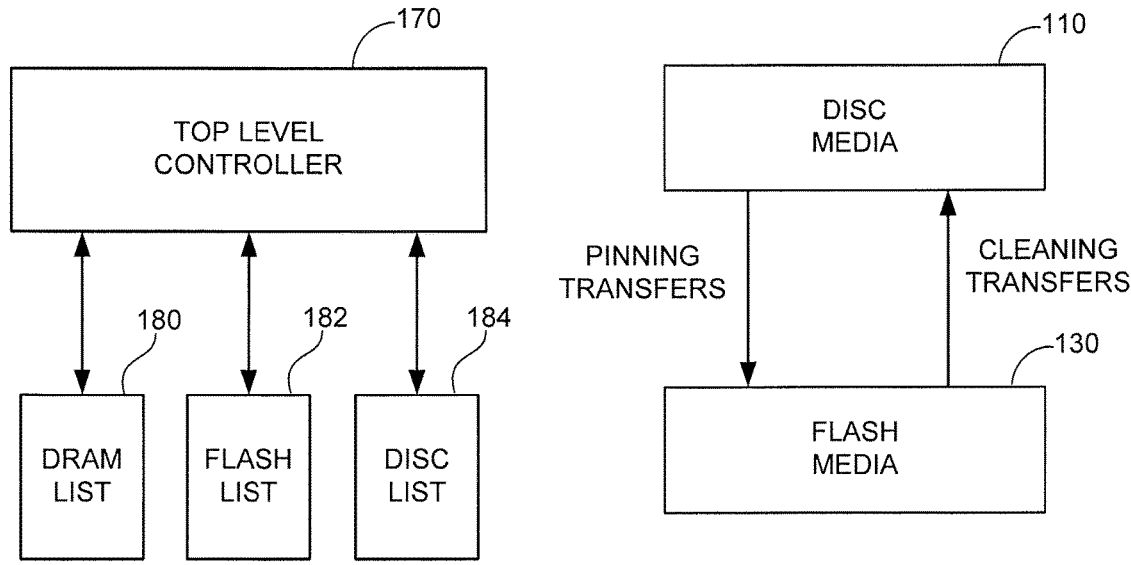
FIG. 5
FIG. 6

HYBRID DATA STORAGE DEVICE WITH EMBEDDED COMMAND QUEUING

SUMMARY

Various embodiments of the present disclosure are generally directed to a hybrid data storage device that utilizes embedded command queuing to transfer data between internal memory storage structures.

In some embodiments, a hybrid device has a hard disc drive (HDD) controller circuit coupled to non-volatile rotatable storage media and a solid state drive (SSD) controller circuit coupled to non-volatile solid state memory. A top level controller circuit directs a first portion of the received access commands to the HDD controller circuit and a second portion of the received access commands to the SSD controller circuit. The top level controller circuit performs an embedded queuing operation to forward internally generated data cleaning commands to an HDD command queue to write data previously transferred from the host device to the solid state memory to the rotatable storage media concurrently while least one of the first portion of the access commands is pending in the HDD command queue.

In other embodiments, a method includes steps of using a hybrid data storage device to receive host data transfer access commands from a host device; forwarding a first portion of the access commands to a hard disc drive (HDD) controller circuit coupled to non-volatile rotatable storage media of the hybrid data storage device for placement thereof into an HDD command queue pending execution in a selected order; forwarding a different, second portion of the access commands to a solid state drive (SSD) controller circuit coupled to non-volatile solid state memory of the hybrid data storage device for placement thereof into an SSD command queue pending execution in a selected order; and performing an embedded queuing operation to forward internally generated data cleaning commands to the HDD command queue to write data previously transferred from the host device to the solid state memory to the rotatable storage media concurrently with the presence of at least one of said first portion of the access commands pending in the HDD command queue.

These and other features and aspects of various embodiments of the present disclosure can be understood upon a review of the following detailed description in conjunction with the associated drawings.

BRIEF DESCRIPTION OF THE DRAWINGS

FIG. 4 shows an arrangement of the controller circuitry from FIG. 1 in accordance with some embodiments.

FIG. 5 illustrates various data structures utilized by the top level controller circuit of FIG. 4 in accordance with some embodiments.

FIG. 6 illustrates internal pinning and cleaning data transfers carried out by the hybrid data storage device.

DETAILED DESCRIPTION

Figure 1:
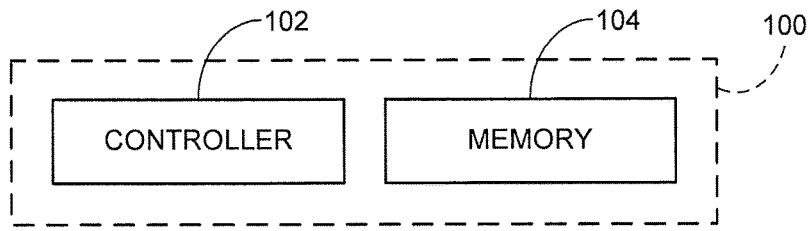
FIG. 1 is a block diagram for a data storage device characterized as a hybrid storage device in accordance with various embodiments.

The present disclosure generally relates to data storage systems, and more particularly to embedded command queuing in a hybrid data storage device.

Data storage devices operate to store and retrieve computerized user data in a fast and efficient manner. Data storage devices can utilize a variety of different types of storage media, including rotatable recording discs of the type commonly used in hard disc drives (HDDs) and solid state semiconductor memory of the type commonly used in solid state drives (SSDs).

So-called hybrid data storage devices utilize two or more distinct forms of non-volatile storage media to store user data. Some forms of hybrid data storage devices (HDSDs, also sometimes referred to as solid state hybrid drives, or SSHDs) utilize a main memory formed from rotatable magnetic recording media (e.g., magnetic discs) and a smaller auxiliary memory formed from solid state (e.g., flash) memory cells. Both forms of storage media provide a combined non-volatile storage space to store user data transferred to the device from a host.

Hybrid devices are designed to combine the benefits of low cost mass storage afforded by rotatable magnetic recording media with the faster transfer rate performance provided by solid state memory (e.g., flash). It is common to operate a hybrid device in such a way that high priority data tend to be stored in the solid state memory since such memory tends to provide faster data transfer rates as compared to the relatively slower rotatable media. Ideally, hybrid devices should provide faster overall transfer rate performance that conventional HDDs and should be significantly less expensive than SSDs. The ratio of solid state memory to rotatable storage in a hybrid device can vary, but usually the amount of storage capacity provided by the solid state memory is on the order of about 1-2% of the size of the rotatable media. Other relative values and ratios can be used as desired.

While hybrid devices have been found operable in providing enhancements in the overall data transfer capacity of a storage device as compared to an HDD, there are a number of limitations that have been found to be unique to hybrid devices that are not easily resolved. It is well established that current generation SSDs can sustain significant data transfer rates, such as on the order of 400 megabytes (MB, $10^9$ bytes) per second (MB/s) or more. Depending on a number of factors, rotatable disc HDDs can sustain data transfer rates that are perhaps 10-15% of an SSD.

It might be expected that hybrid drives would provide significantly better transfer rate performance than HDDs due to the inclusion of the solid state memory which, if properly managed, should result in significant increases in the overall data rate for the device. After all, the solid state memory in a hybrid device will tend to have native transfer rates consonant with those of SSDs, and the most active data sets will be maintained in the solid state memory of the hybrid device. Conventional wisdom would further suggest that increasing the ratio of the solid state memory in a hybrid device, such as to 20-25% or more of the native disc capacity, would tend to further enhance the overall data transfer rate of the hybrid device. In practice, this has not generally been the case.

One limitation associated with hybrid devices is that, as noted above, the faster solid state memory only constitutes a small proportion of the overall total storage capacity of the device. Thus, unlike an SSD where all data stored by the device will be resident in the solid state memory, only a small portion of the available data will be stored in the solid state memory in a hybrid device, and this data will change over time. There is accordingly a large processing overhead required to identify, track and manage the data stored in the solid state memory. Increasing the size of the solid state memory would increase this overhead processing burden and could potentially result in a slower overall transfer rate.

Another unique property associated with most hybrid devices is that all data sets received by a hybrid device will usually also be stored by the rotatable media. Even if data are initially stored in the flash memory, a backup copy will be written to disc using a process sometimes referred to as data cleaning. In a similar fashion, sometimes data sets initially stored to the disc media will be migrated, or promoted, to the flash (so called "data pinning"). Data cleaning and pinning operations are usually carried out in the background during normal device operation, and can significantly add to the overall command loading of the device.

Accordingly, various embodiments of the present disclosure are generally directed to an apparatus and method for operating a hybrid data storage device (HDSD or SSHD) in such a way that overcomes these and other limitations associated with the existing art.

As explained below, some embodiments provide a hybrid device with a hard disc drive (HDD) controller circuit that is coupled to non-volatile rotatable storage media (such as a magnetic disc). The hybrid device further has a solid state drive (SSD) controller circuit coupled to non-volatile solid state memory (such as flash). A volatile memory (such as DRAM) is respectively coupled to the HDD and SSD controller circuits to cache data during transfers associated with the rotatable storage media and with the solid state memory.

A top level controller circuit is operably coupled to an interface connector of the hybrid device. Generally, the top level controller directs various access commands received from a host to the HDD and SSD controllers; for data to be stored to disc, the top level controller passes the associated access commands to the HDD controller for ordering in an HDD command queue. For data to be stored to flash, the top level controller passes the associated access commands to the SSD controller for ordering in an SSD command queue. The HDD and SSD controllers process the received access commands in the respective queues to transfer the associated data between the DRAM and the disc and flash, respectively. These actions are carried out concurrently and independently along dual parallel data processing paths.

The top level controller monitors the operation of the respective HDD and SSD controllers, and periodically forwards additional data cleaning commands to the HDD controller to internally transfer data initially stored in the flash memory to the disc memory. This process is referred to as embedded queuing. Instead of waiting for idle periods of device operation in which no pending HDD commands are present in the HDD controller command queue, the top level controller selectively meters the cleaning commands so as to maintain a relatively small number of the cleaning commands within the pending HDD transfer commands at substantially all times (except perhaps at times of full loading).

The HDD controller has the capability of selecting an optimal ordering of the execution of the pending commands in the HDD command queue based on various parameters including the radial location of the respective data sectors on the media associated with the command and the rotational latency (distance) required for the associated sector locations to rotate around and reach the data transducer. In this way, the HDD controller is configured to select, based on a given set of pending commands, an optimal ordering so that the data associated with the commands can be transferred in the fastest time.

As disclosed below, should the HDD command queue have a total number of X host access commands, the system forwards an additional number Y of cleaning commands to the pending command queue so that more than just host based commands are pending in the HDD queue; rather, the HDD queue has X+Y total commands. While data cleaning commands are envisioned, other forms of commands can be generated and inserted by the top level controller as well.

The rate at which the cleaning commands are added is metered to ensure that the overall data I/O rates experienced by the host device are not substantially effected. In some embodiments, the number of cleaning commands is set to a given ratio of the existing commands: if 3-5 commands are pending, one or two more additional background commands might be slipped into the HDD command queue, or if 10-12 commands are pending, 3-4 commands may be added, and so on. In other embodiments, cleaning commands may be added to maintain the total number of commands below a selected threshold. By continuously metering cleaning commands to the HDD command queue, significant amounts of background processing can be implemented on an ongoing basis without the need to "wait" for an idle period (e.g., 25 milliseconds of non-host activity, etc) before initiating these background servicing operations. It will be noted that the types of background operations can vary. In some embodiments both cleaning and pinning operations are envisioned so that pinning operations are similarly slipped into the SSD command queue at the same time.

Command queuing capabilities of the device interface may be utilized to enhance overall data transfer rate performance. For example, the SATA interface protocol supports up to 32 pending commands in a given queue, and the SAS interface protocol allows up to 128 pending commands in a given queue. Other interfaces may support other numbers of pending commands. By increasing the total number of pending commands, enhanced cache strategies can be carried out and the data stored in the flash can be efficiently and timely transferred to the disc media without substantially affecting observed host data transfer rates.

These and other features and advantages of various embodiments can be understood beginning with a review of FIG. 1 which shows an exemplary data storage device 100. The data storage device 100 includes a controller 102 and a memory 104. The controller 102 is a control circuit that provides top level control functionality for the storage device, and may be realized in hardware, software and/or firmware. The controller circuit may constitute one or more programmable processors having associated programming instructions stored in a memory which, when executed, cause the processor(s) to carry out various control functions as explained herein. Other forms of controller circuit can be utilized, such as hardware circuits, programmable gate arrays, logic networks, application specific integrated circuits (ASICs), system on chip (SOC) devices, etc. As will be recognized, these and other forms of controller circuits may be formed of various logic, storage and switching elements using semiconductor fabrication techniques.

The memory 104 provides non-volatile memory storage for user data transferred to the storage device by a host device. The memory may incorporate a number of different types of non-volatile storage such as solid-state memory (e.g., flash), rotatable storage media, etc. For purposes of the present illustrative example, the device 100 is contemplated as comprising a hybrid data storage device (HDSD or SSHD) so that the memory 104 includes both rotatable storage media and solid state semiconductor memory. While not limiting, the rotatable media are contemplated as magnetic recording media and the solid state memory is contemplated as flash memory. Other arrangements can be used.

Figure 2:
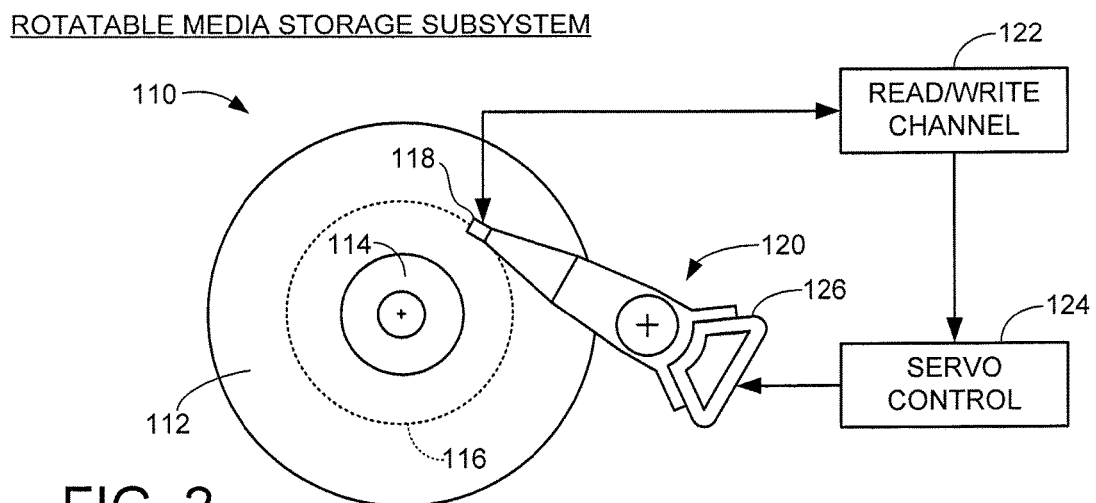
FIG. 2 is an isometric depiction of a rotatable media storage subsystem of the hybrid storage device of FIG. 1 constructed and operated in accordance with some embodiments.

FIG. 2 shows a rotatable media storage subsystem 110 of the memory 104 of FIG. 1 in accordance with some embodiments. The subsystem 110, also sometimes variously referred to as rotatable media or the disc, constitutes aspects of a hard disc drive (HDD) storage system. Various other elements may be incorporated into the subsystem so the diagram is illustrative and not limiting.

One or more rotatable magnetic recording discs 112 are fixed for rotation about a central axis of a spindle motor 114. A number of concentric tracks 116 are arranged on each of the disc surfaces and are accessed by a data read/write transducer (head) 118.

Each head 118 is moved across the surface of the disc using a rotary actuator 120. A read/write (R/W) channel circuit 122 provides write currents to and receives transduced readback signals from each head during respective write and read operations. A servo control circuit 124 provides closed loop positional control of the position of the heads 118 using embedded servo data (not separately shown) from the disc surfaces. The servo circuit 124 applies current to a coil 126 of a voice coil motor (VCM) to adjust the position of a selected head accordingly.

Figure 3:
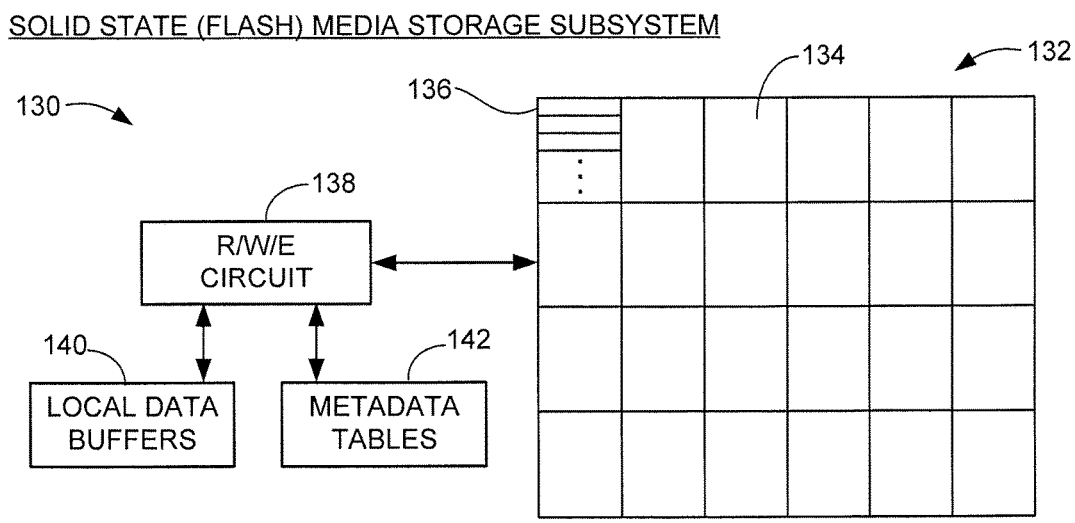
FIG. 3 is an isometric depiction of a solid state (flash) media storage subsystem of the hybrid storage device of FIG. 1 constructed and operated in accordance with some embodiments.

FIG. 3 shows a solid state media storage subsystem 130 of the memory 104 of FIG. 1 in accordance with some embodiments. The subsystem 130 is also sometimes referred to as solid state media or the flash, and is generally arranged as aspects of a solid state drive (SSD) storage system. Various other elements may be incorporated into the subsystem so the diagram is illustrative and not limiting.

The solid state media 130 includes a flash array 132 of flash memory cells arranged into rows and columns. The flash cells are grouped into erasure blocks 134, each constituting a smallest unit of the flash array that can be erased as a unit. Each erasure block 134 is formed from individual pages (row) 136 of memory cells to which fixed sized blocks of data may be written.

A read/write/erase (R/W/E) circuit 138 directs data transfers to and from the respective pages 136, and performs data migrations and erasures during garbage collection operations. A number of local data buffers 140 in the form of volatile memory serve to temporarily buffer data during such activities. Local volatile memory 142 can further be used to load, store and utilize metadata to track the locations and revision levels of various data sets stored in the array 132.

FIG. 4 provides a top level architecture for the device 100 in accordance with some embodiments. The disc media subsystem 110 from FIG. 2 is controlled by an HDD controller circuit 150, and the flash media subsystem 130 from FIG. 3 is controlled by an SSD controller circuit 160.

Top level control of these controllers is in turn provided by a top level controller circuit 170. As mentioned above, these respective controller circuits are incorporated into the general controller 102 of FIG. 1 and may be variously realized as discussed above. It is contemplated albeit not necessarily required that these respective control circuits are physically realized as separate programmable processors or hardware processing circuits. The various circuits may be incorporated into a consolidated system on chip (SOC) integrated circuit device.

FIG. 4 further shows a local buffer memory (DRAM) 172. The DRAM is coupled to the respective controllers 150, 160 and 170 and is arranged to store user data during data transfer operations. The DRAM 172 may store other forms of data as well, including programming utilized by the various controllers, control parameters, metadata, state data, etc. The DRAM may be partitioned into separate sections, such as an HDD partition 174 for use by the HDD controller 150 and an SSD partition 176 for use by the SSD controller. Other arrangements can be used.

Without limitation, the architecture as shown in FIG. 4 can be characterized as an SSD with an attached auxiliary HDD subsection. That is, from an architectural standpoint, a primary data path is provided via the top level controller 170, SSD controller 160 and flash media 130. This is true even though the total data storage capacity of the flash media 130 is contemplated as being significantly smaller than the total data storage capacity of the disc media 110. In some embodiments, the flash capacity is less than about 5%, and more in the range of about 1-2%, of the disc capacity. This is not limiting, however, as any respective ratios of solid state memory capacity and rotatable storage data capacity can be accommodated by this embodiment. In some cases, the top level controller 170 may emulate host commands to the HDD controller circuit 150 so that the HDD controller circuit operates as if it is responding directly to the connected host device, but such transfer commands are mediated by the top level controller.

FIG. 5 is a schematic illustration to denote various data structures that may be utilized by the top level controller 170 of FIG. 4 in some embodiments. Three such data structures are shown; a DRAM list 180, a flash list 182 and a disc list 184. These data structures may take the form of a linked list or other suitable data structure to reflect the respective data sets stored in each of the respective memories (DRAM 172, flash media 130 and disc media 110). The data structures may be stored in local memory, such as the DRAM 172 or other memory accessible by the top level controller 170. The data structures may include logical or virtual addressing information, such as logical block addresses (LBAs), virtual block addresses (VBAs), etc. associated with the data. This allows the top level controller 170 to quickly and efficiently locate existing data sets and make determinations on where certain data are located to satisfy a read request, and to determine a suitable target location for the storage of input write data during a write request.

FIG. 6 shows the respective disc media 110 and flash media 130 from FIGS. 2-4 to illustrate certain types of internal data transfers that may take place under the direction of the top level controller 170 during device operation. Pinning transfers represent the transfer of data from the disc media 110 to the flash media 130, and cleaning transfers represent the transfer of data from the flash media 130 to the disc media 110.

Pinning transfers may be carried out based on a determination that the data are of high relative value and therefore it would be advantageous to store a copy of the data in the flash memory. The original copy of the data is maintained in the disc media as backup. Examples of data that might be pinned in this manner may include host operating system files, certain hot data that are subjected to a high rate of data request and/or update, data identified based on current trends (including sequential requests or previous characterizations of data requests) that indicate that a cache hit for the data may occur in the near future, and so on.

Cleaning transfers are generally carried out on all data initially stored to the flash media 130 from the host to transfer a copy of the data to the rotatable disc media 110. This provides a non-volatile back up of every set of data received for storage by the device 100. Once the data are cleaned, the copy of the data in the flash media 130 may be ejected or retained. If retained, subsequent read operations for the data will be serviced from the flash 130. If ejected, the data may be marked as stale data to allow a garbage collection operation to erase the locations storing the stale data to make room for newer, higher priority data.

Figure 7:
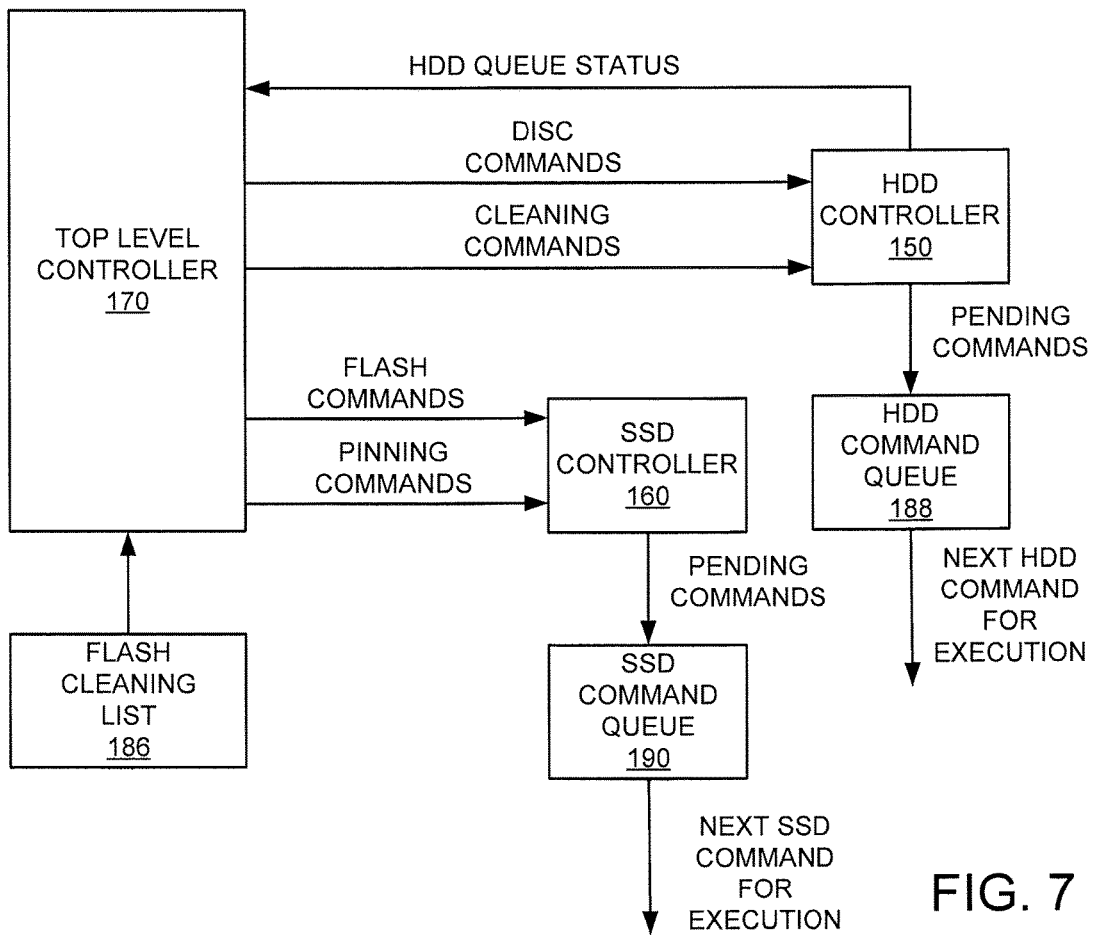
FIG. 7 is a functional block representation to illustrate a manner in which embedded queuing can be carried out to support cleaning transfers by the device.

FIG. 7 provides a functional block representation of a process flow for embedded queuing that may be carried out by the device 100 at selected times in accordance with some embodiments. The top level controller 170 references a flash cleaning list 186 which represents a list of data sets that have been stored to the flash memory 130, but corresponding copies of the data sets have not yet been stored to the disc memory 110. The flash cleaning list can be generated and maintained in relation to differences between the disc storage list data structure 184 and the flash storage list data structure 182 (see FIG. 5). Thus, the flash cleaning list 186 represents a list of data sets that need to be copied (or migrated) to disc. Other data may be utilized in the flash cleaning list as well, such as aging data (e.g., how long the data have been resident in the flash, etc.).

As discussed above, the top level controller 170 operates to direct disc commands received from the host to the HDD controller 150 indicative of access commands associated with host disc transfers. These host access commands may include host write commands to write host data to the discs, and host read commands to read data back from the discs.

The HDD controller 150 maintains an HDD command queue 188 as a sorted list of commands for execution involving the rotatable media 112. This sorted list takes into account the rotational angular position of the media, as well as the radial position of the heads 118, to select an optimal order of execution of the pending commands to minimize overall host I/O access rates. In similar fashion, the SSD controller 160 maintains an SSD command queue 190 as a list of pending operations involving data transfers with the flash memory 130.

It will be appreciated that, as known in the art, the sorting of commands in the HDD command queue 188 can employ a complex algorithm that takes into account settling time estimates and rotational latencies to solve for the best ordering of the execution of the pending commands. Generally, the more available commands in the queue, the more efficient the execution of the pending HDD commands. The SSD command queue 190 may take a simpler approach, such as a first in first out (FIFO) approach, although there may be efficiencies available through executing commands in parallel to different dies, arrays, etc.

As shown in FIG. 7, the top level controller 170 provides a metered number of additional cleaning commands associated with the flash cleaning list 186 which are added to the disc commands to provide an overall set of commands in the HDD command queue 188. If X represents the total number of pending HDD disc commands, and Y represents the total number of cleaning commands, then the total number of commands pending in the HDD command queue 188 at any given time will be Z commands where Z is the sum of X and Y (X+Y=Z).

Figure 8:
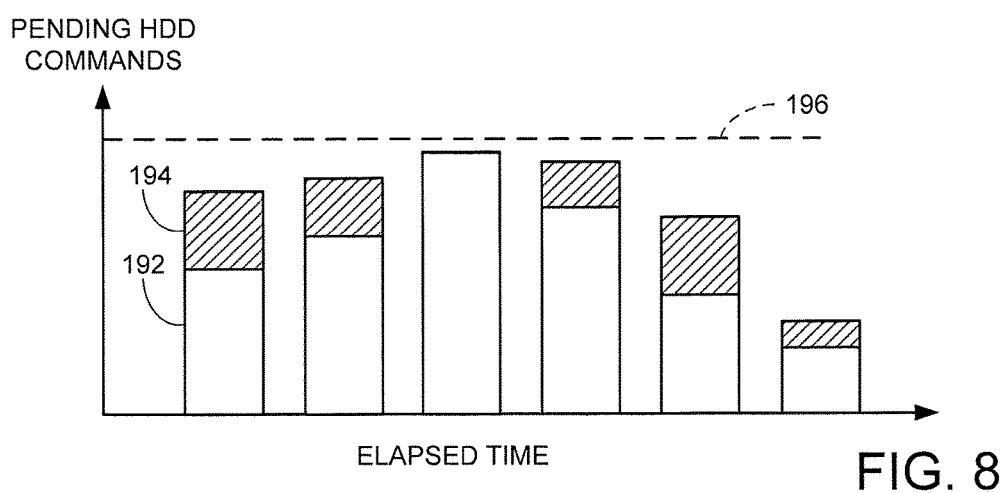
FIG. 8 is a graphical representation of various queuing levels experienced by the device over time.

The top level controller 170 meters the cleaning commands based on a number of factors. FIG. 8 illustrates different situations in which different respective ratios of cleaning commands and disc commands may be provided to the queue 188. Generally, FIG. 8 is a graphical representation of various bar graphs where a solid component 192 represents a total number of disc-based commands pending in the queue 188, and a cross-hatched component 194 indicates a corresponding number of cleaning commands that are added to the queue 188. Line 196 represents a maximum number of pending commands that may be permitted to be present in the queue 188. This can be set by the associated interface or an internal limit established by the HDD controller 150 or the top level controller 170.

As can be seen from FIG. 8, the respective ratios may vary based on a number of factors. The pending number of additional cleaning commands can vary over time to maintain the total number of pending commands equal to or less than the threshold 194. In some embodiments, Y may be on the order of from about 10% up to about 50% or more, depending on the overall system loading. For example, if X is around 3-5, then Y may be set to 1-2; if X is around 10-12, Y may be set to 3-4. In this way, the number of metered cleaning commands is selected based on the existing number of host access commands.

In other embodiments, the number of cleaning commands may be increased to bring the total number of pending commands up near the threshold 196, as shown at 192A and 192B. That is, if only a few pending host access commands are resident in the queue (as represented at 192A), a relatively larger number of cleaning commands may be added to the queue (as represented at 194A).

Pinning operations may be concurrently handled in a similar fashion. Referring back to FIG. 7, the top level controller 170 provides normal flash commands to store data to the flash memory, as well as pinning commands to transfer copies of data sets stored in the disc memory to the flash memory. Hence, pinning commands to transfer data from the disc media 110 to the flash memory 130 can be inserted into the SSD command queue 190 using the foregoing techniques.

Each cleaning command forwarded to the HDD controller 150 requires a read operation to be executed by the flash memory 130 to place the readback data into the DRAM 172 (see FIG. 4) so the data are ready to be processed and transferred to the disc media 110. Similarly, each pinning command forwarded to the SSD controller 160 requires a read operation to be executed by the disc media 110 to place the readback data into the DRAM 172 so the data are ready to be processed and transferred to the flash memory 130.

Figure 9:
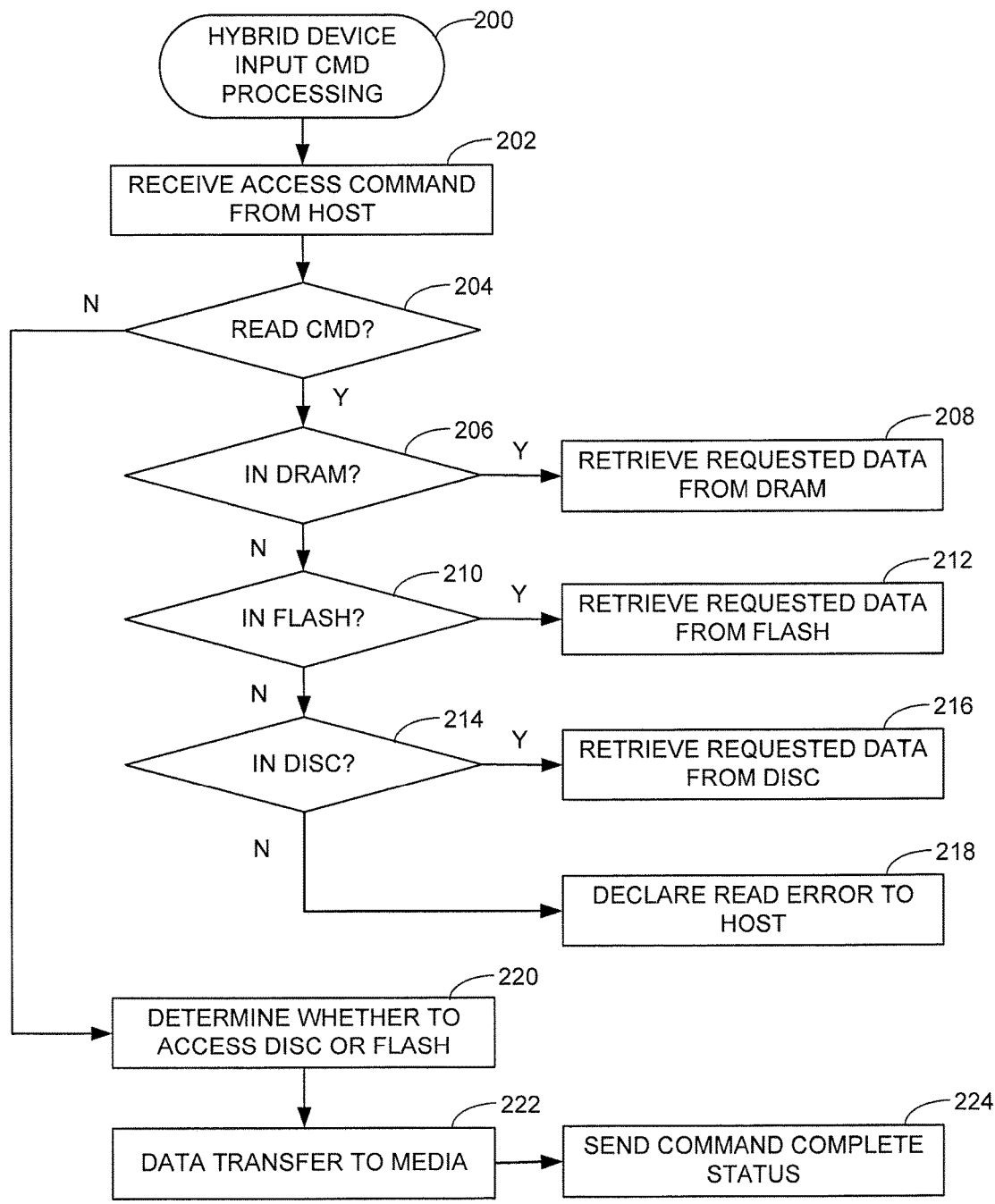
FIG. 9 is a generalized flow chart for a hybrid device input command (CMD) processing routine illustrative of steps carried out in accordance with some embodiments.

FIG. 9 provides a hybrid device input command (CMD) processing routine 200 illustrative of steps carried out in accordance with the foregoing discussion. It will be understood that the steps shown in FIG. 9 are merely exemplary and are not limiting, and various other steps may be added or appended as required. The various steps shown may be omitted, modified, carried out in a different order, etc. It is contemplated albeit not required that the steps shown in FIG. 9 may correspond to programming steps implemented, via suitable programming stored in memory, for the top level controller 170.

At step 202, an access command is received from a host device coupled to a hybrid device such as 100. Decision step 204 determines whether the received host access command is a read command. If so, the flow proceeds to step 206 which determines whether the requested data associated with the read command is located in the DRAM 172. As discussed above, this can be carried out including by consulting, by the top level controller 170, a table structure stored in an appropriate memory location, including but not limited to the DRAM 172, that maps the contents of the stored memory on an LBA or other logical block basis (see e.g., FIG. 5).

At such time that the requested data are found to be resident in the DRAM 172, the flow passes to step 208 where the data are retrieved therefrom and returned to the host.

The process continues at step 210 where it is determined whether the data, if not in the DRAM, are located in the flash memory 130. If so, the requested data are retrieved and transferred from the flash at step 212. This can include forwarding the access command by the top level controller 170 to the SSD controller 160, which in turn issues a read command to the local flash media 130 to retrieve the requested data to the DRAM and from there to the host. In some embodiments, the data may be loaded to an available space within the SSD partition 176 (FIG. 4) pending transfer to the requesting host. In some cases, even if the data are already resident in the DRAM, it may be deemed to be more efficient to proceed with satisfying the read request from the flash.

In such cases where the received access command is a read command that cannot be immediately serviced by a cache hit from either the flash memory or the DRAM, the flow continues to step 214 where the top level controller circuit 170 determines whether the access command can be serviced from the disc memory 130. If so, the process flow continues to 216 where the requested data are retrieved from the disc memory and passed to the HDD partition 174 and on to the requesting host using suitable processing (including ordering of the command in the HDD command queue 188 as discussed above). If the data are not available or otherwise cannot be retrieved, a read error is declared, step 218.

If the command is a write command, the flow passes from block 204 to 220 where the top level controller 170 determines whether the input data should be written to flash or disc. The data are thereafter transferred to the appropriate media at step 222, and a command complete status is sent (prior to or following the writing of the data) at step 224. The data that are initially written to the flash media 130 at step 222 are thereafter copied over to the disc media 110 using a hybrid device cleaning transfer process 230 in FIG. 10.

Figure 10:
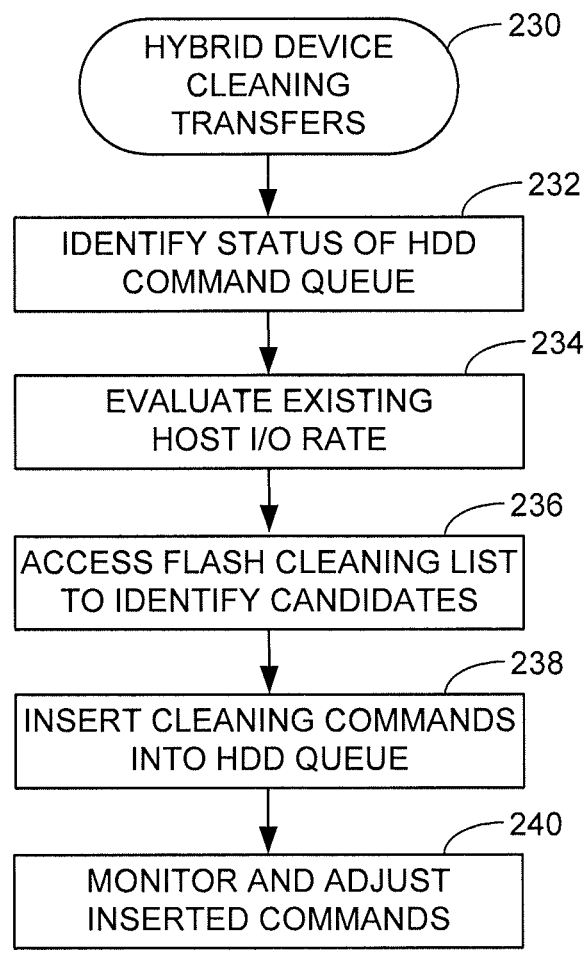
FIG. 10 is generalized flow chart for a hybrid device cleaning transfers routine illustrative of further steps carried out in accordance with some embodiments.

Generally, it is contemplated that the steps in FIG. 10 represent suitable programming utilized by the top level controller 170 to clean, or transfer, flash written data to disc within a suitable time period to ensure a backup copy of the data is archived to the disc. It will be understood that the routine 230 of FIG. 10 is run in the background continuously during normal operation concurrently with the routine 200 of FIG. 9. In some cases, a timer circuit may count the elapsed time that data remain resident in the flash memory 130 pending cleaning, and provide alarm signal notifications to the top level controller. Depending on the security constraints on the system, data may be permitted to remain uncleaned for a relatively short period of time (e.g., several hundred milliseconds) or a relatively longer time (e.g., several minutes or more). This may be user selectable. Regardless, it is contemplated that the cleaning operation will take place in the near future after the data have been successfully written to the flash to ensure a backup copy is written to disc within a reasonable time period.

Continuing with the flow of FIG. 10, the status of the HDD command queue 188 is initially determined at step 232. This can be carried out by a query response provided by the HDD controller 150 to the top level controller 170. This will indicate the number of pending access commands in the HDD command queue, and may provide other information as well such as the existing order of execution that has been selected by the HDD controller. It will be understood that as additional commands are added to the queue, the ordering of the commands by the HDD controller may be reevaluated and changed to provide an updated optimal solution. Contrawise, the existing state of the queue may provide valuable information to the top level controller in selecting those data sets that should be cleaned to provide efficient operation by the device.

As desired, the top level controller 170 may further evaluate the existing host I/O transfer rate. This indicates the current state and recent history of host activity and can help the top level controller to ascertain the kind of work load that the device is currently experiencing, as this may be a factor in determining how many embedded queue commands to transfer to the HDD command queue. For example, during a period of high host I/O interest fewer cleaning commands may be forwarded for processing to help ensure minimal impact is provided to host I/O rates.

The top level controller 170 accesses the flash cleaning list at step 236 to identify candidates for transfer from the flash memory 130 to the disc memory 110. In some cases, LBAs in the flash with temporal or physical proximity to LBAs in the command queue may be selected and promoted for cleaning. In other embodiments, the existing contents of the HDD command queue are not factored into determining the best candidates for cleaning from the flash; rather, other factors such as aging or size, for example, may be used. For example, the oldest pending flash stored data sets may be serviced first, and so on.

At step 238, the top level controller 170 inserts certain cleaning commands into the HDD command queue 188. This is carried out as discussed above in FIG. 7. In response, the HDD controller treats these as input commands and inserts them into the HDD command queue and orders the existing pending commands (both original disc commands and cleaning commands) into an optimum execution order. The commands are thereafter executed by the HDD controller 150 in due course.

Finally, step 240 shows that the top level controller 170 monitors and adjusts the rate with which additional cleaning commands are metered to the HDD controller 150. In this way, except at times of high disc workload (see e.g., FIG. 8), a few pending commands are metered at a time to transfer, at a regular rate, the data from the flash to the disc.

It will be appreciated that, as the top level controller 170 passes each cleaning command to the HDD controller 150 in turn, the top level controller provides a corresponding read operation to the SDD controller 160 to read out the associated data and to place this data in the HDD partition 174 of the DRAM 172 (see FIG. 4). The HDD controller 150 can thereafter format the data as required to write the data from the DRAM to the disc memory. While not shown in FIG. 10, pinning commands to effect transfers from the disc memory 110 to the flash memory 130 can be handled in a similar fashion.

It will now be appreciated that the various embodiments presented herein can provide a number of benefits. By selectively metering the cleaning commands to effect the transfer of data from flash to disc, an orderly internal transfer can be carried out in such a way as to have substantially little or no effect on the host I/O transfer rate. Instead of waiting for periods of idle time (such as, for example, 25 milliseconds of no commands in the HDD command queue) before initiating cleaning operations, ongoing cleaning operations can be carried out continuously. Existing workloads can be taken into account. In some cases, by carefully selecting the cleaning commands, little or no additional processing overhead can be experienced by the HDD controller since such commands can be carried out based on existing system latencies; for example, data writes to existing tracks or bands already subjected to servicing of host commands may be carried out with little or no additional latency time. Pinning commands to transfer data from the disc to the flash can also be handled in like manner concurrently with the cleaning operations discussed above.

The various embodiments presented herein have contemplated a hybrid storage device in which the main, slower memory is a rotatable media memory (e.g., rotatable magnetic recording discs) and the auxiliary, faster memory is a solid state memory (e.g., flash memory). In such case, the cleaning operation serves to transfer data from the relatively faster memory to the relatively slower memory. This is merely exemplary and is not necessarily limiting.

Other embodiments can use any suitable combination of respective memories, including but not limited to applications where the slower main memory is a first form of solid state memory (e.g., erasable flash memory, etc.) and the faster auxiliary memory is a different, second form of solid state memory (e.g., rewritable STRAM, RRAM, PCRAM, PLCs, etc.). In such case, there may be a benefit to use the top level controller circuit to use embedded queuing to schedule the transfers of data from the faster to the slower memory.

This would provide benefits consonant with those discussed above. It is noted, for example, that erasable memories such as flash memory are subjected to periodic garbage collection operations since each subsequent version of a set of data generally needs to be written to a new location, and metadata structures are usually employed to direct the system, such as via forward pointers, to the location of the latest version. Rewritable memories, on the other hand, can be overwritten with existing data and therefore may provide more efficient access, retrieval and management systems.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A hybrid data storage device comprising:
a hard disc drive (HDD) controller circuit coupled to non-volatile rotatable storage media;
a solid state drive (SSD) controller circuit coupled to non-volatile solid state memory;
a local volatile buffer memory configured to temporarily store data transferred between a host device and each of the non-volatile rotatable storage media and the non-volatile solid state memory; and
a top level controller circuit configured to receive host data transfer access commands from the host device and direct a first portion of the access commands to the HDD controller circuit for inclusion in an HDD command queue pending subsequent execution and to direct a second portion of the access commands to the SSD controller circuit for inclusion in an SSD command queue pending subsequent execution, the top level controller further configured to perform an embedded queuing operation metering a nonzero rate of internally generated data cleaning commands that varies in relation to a total number of the host data transfer access commands pending in the HDD command queue when the HDD command queue is less than full, the cleaning commands operably copying data from the non-volatile solid state memory to the volatile buffer memory followed by forwarding the copied data from the volatile buffer memory to the HDD command queue to write data previously transferred from the host device to the non-volatile solid state memory to the non-volatile rotatable storage media concurrently with the presence of at least one of said first portion of the access commands pending in the HDD command queue.

2. The hybrid data storage device of claim 1, wherein the rotatable media comprises a magnetic recording disc.

3. The hybrid data storage device of claim 1, wherein the solid state memory comprises a flash memory array.

4. The hybrid data storage device of claim 1, wherein the top level controller circuit emulates communications between the host device and the HDD controller circuit.

5. The hybrid data storage device of claim 1, wherein the local volatile buffer memory comprises a dynamic random access memory (DRAM) partitioned into a first portion used to temporarily store data transferred between the non-volatile rotatable storage media and the host, and a second portion used to temporarily store data transferred between the non-volatile solid state memory and the host.

6. The hybrid data storage device of claim 5, wherein the local volatile buffer memory is partitioned into a first partition accessible only by the HDD controller circuit and a second partition accessible only by the SSD controller circuit.

7. The hybrid data storage device of claim 1, wherein a total number of the cleaning commands forwarded to the HDD controller circuit by the top level controller circuit is selected in relation to a total number of the host data transfer access commands pending in the HDD command queue.

8. The hybrid data storage device of claim 1, wherein a total number of the cleaning commands forwarded to the HDD controller circuit by the top level controller circuit is selected to bring a combined total number of the cleaning commands and a total number of the host data transfer access commands up to a maximum predetermined threshold number of commands.

9. The hybrid data storage device of claim 1, wherein a population of available cleaning commands are identified by the top level controller circuit, and the top level controller circuit selects at least one of the available cleaning commands for forwarding to the HDD controller circuit responsive to at least one of the pending host data transfer access commands in the HDD command queue.

10. The hybrid data storage device of claim 1, wherein the top level controller circuit directs the SSD controller circuit to execute a read operation to retrieve a data set from the solid state memory to the volatile buffer memory associated with a selected cleaning command, followed by forwarding the selected cleaning command to the HDD controller circuit.

11. The hybrid data storage device of claim 1, wherein the top level controller circuit is further configured to concurrently perform a second embedded queuing operation to forward internally generated data pinning commands to the SSD command queue to write data previously transferred from the host device to the rotatable storage media to the solid state memory concurrently with the presence of at least one of said second portion of the access commands pending in the SSD command queue.

12. A computer implemented method comprising:
using a hybrid data storage device having a local volatile buffer memory configured to temporarily store data associated with host data transfer access commands from a host device;
forwarding a first portion of the access commands to a hard disc drive (HDD) controller circuit coupled to non-volatile rotatable storage media of the hybrid data storage device for placement thereof into an HDD command queue pending execution in a selected order;
forwarding a different, second portion of the access commands to a solid state drive (SSD) controller circuit coupled to non-volatile solid state memory of the hybrid data storage device for placement thereof into an SSD command queue pending execution in a selected order; and
performing an embedded queuing operation metering a nonzero rate of internally generated data cleaning commands that varies in relation to a total number of the host data transfer access commands pending in the HDD command queue when the HDD command queue is less than full, the cleaning commands copying data from the non-volatile solid state memory to the volatile buffer memory followed by forwarding the copied data from the volatile buffer memory to the HDD command queue to write data previously transferred from the host device to the non-volatile solid state memory to the non-volatile rotatable storage media concurrently with the presence of at least one of said first portion of the access commands pending in the HDD command queue.

13. The method of claim 12, wherein the rotatable media comprises a magnetic recording disc.

14. The method of claim 12, wherein the solid state memory comprises a flash memory array.

15. The method of claim 12, wherein the local volatile buffer memory comprises a dynamic random access memory (DRAM) partitioned into a first portion used to temporarily store data transferred between the non-volatile rotatable storage media and the host, and a second portion used to temporarily store data transferred between the non-volatile solid state memory and the host.

16. The method of claim 12, wherein a total number of the cleaning commands forwarded to the HDD controller circuit by the top level controller circuit is selected in relation to a total number of the host data transfer access commands pending in the HDD command queue.

17. The method of claim 12, wherein a total number of the cleaning commands forwarded to the HDD controller circuit by the top level controller circuit is selected to bring a combined total number of the cleaning commands and a total number of the host data transfer access commands up to a maximum predetermined threshold number of commands.

18. The method of claim 12, wherein a population of available cleaning commands are identified by the top level controller circuit, and the top level controller circuit selects at least one of the available cleaning commands for forwarding to the HDD controller circuit responsive to at least one of the pending host data transfer access commands in the HDD command queue.

19. The method of claim 12, wherein the top level controller circuit directs the SSD controller circuit to execute a read operation to retrieve a data set from the solid state memory to the local volatile buffer memory associated with a selected cleaning command, followed by forwarding the selected cleaning command to the HDD controller circuit.

20. The method of claim 12, wherein the top level controller circuit is further configured to concurrently perform a second embedded queuing operation to forward internally generated data pinning commands to the SSD command queue to write data previously transferred from the host device to the rotatable storage media to the solid state memory concurrently with the presence of at least one of said second portion of the access commands pending in the SSD command queue.

* * * * *